Jan. 19, 1965 R. N. SHERWIN 3,166,742
CONTROL FOR LAMP BANK DISPLAYS
Filed March 22, 1963 9 Sheets-Sheet 6

INVENTOR.
RICHARD N. SHERWIN
BY Wells & St.John
ATTYS.

Jan. 19, 1965 R. N. SHERWIN 3,166,742
CONTROL FOR LAMP BANK DISPLAYS
Filed March 22, 1963 9 Sheets-Sheet 8
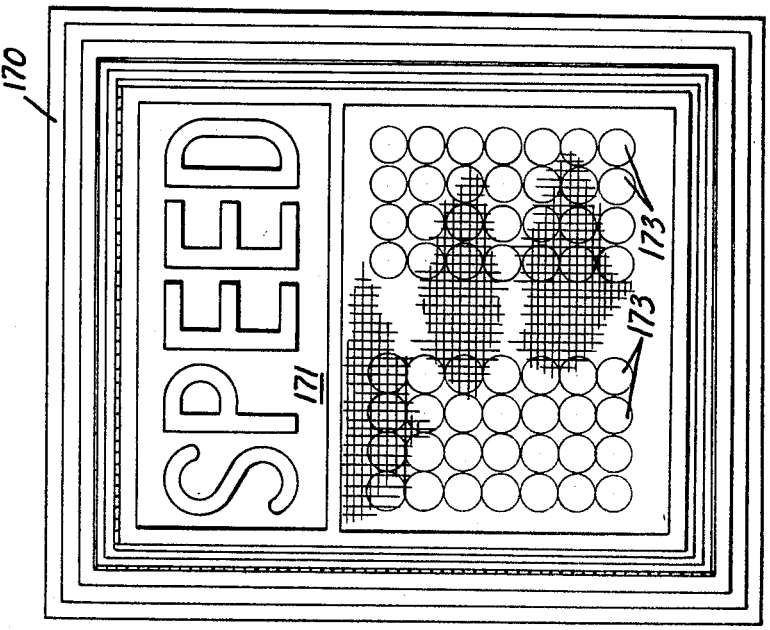
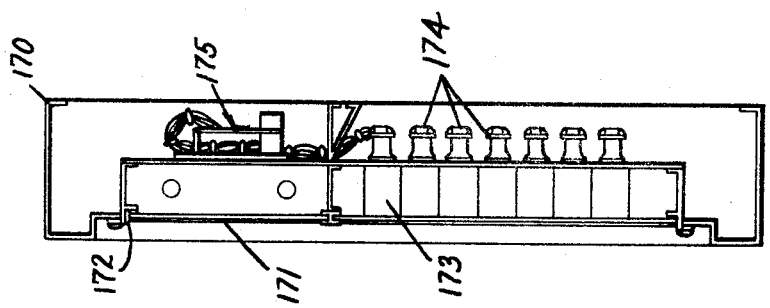
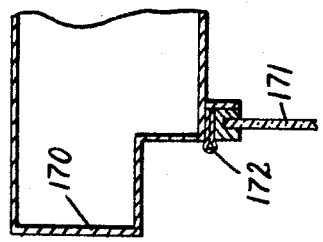
INVENTOR.
RICHARD N. SHERWIN
BY
ATTYS.

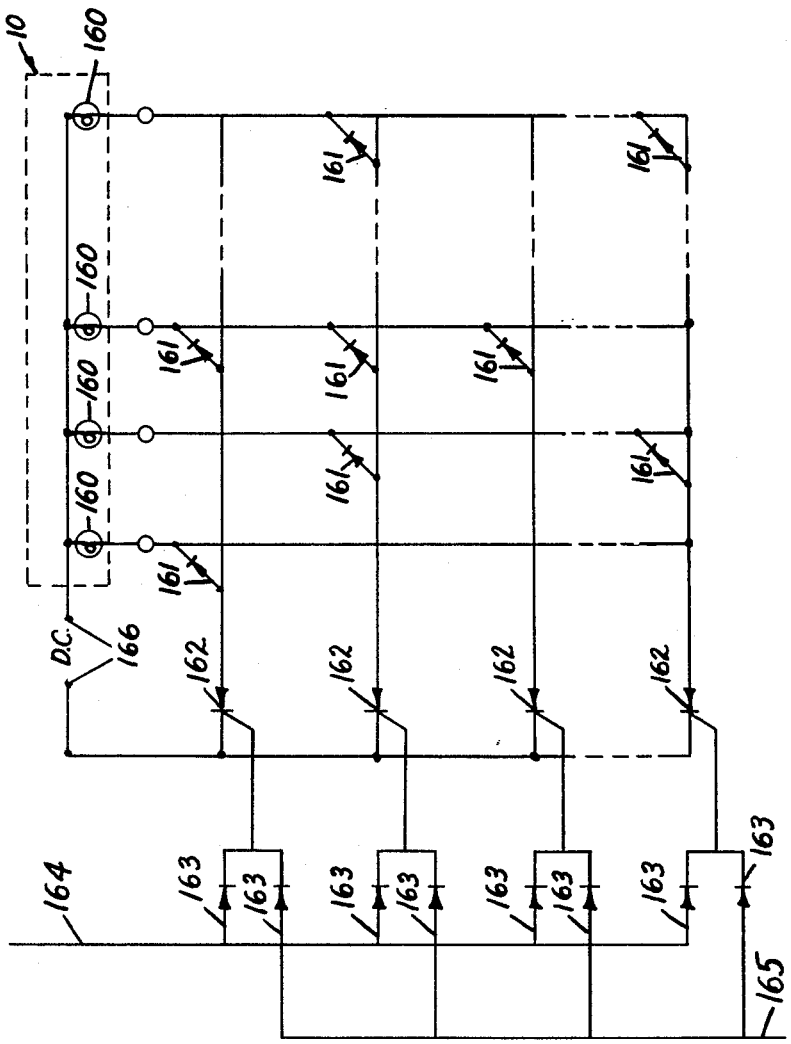

United States Patent Office 3,166,742
Patented Jan. 19, 1965

3,166,742
CONTROL FOR LAMP BANK DISPLAYS
Richard N. Sherwin, Rockford Bay, Idaho, assignor to American Sign & Indicator Corporation, Spokane, Wash., a corporation of Washington
Filed Mar. 22, 1963, Ser. No. 267,202
7 Claims. (Cl. 340—334)

This invention relates to a novel control for lamp bank displays, such as time and temperature signs, scoreboards, or highway signs. The application of these controls is not limited to these fields alone but may be extended to any lamp bank display using continuous or changeable display characters.

A first object of this invention is to provide a novel control for a lamp bank display which is compact in size, using semi-conductor components for high efficiency and low maintenance. The present application utilizes transistors, diodes and silicon controlled rectifiers (SCR). These modern electronic components allow one to better utilize printed circuitry and modular units, and insure a long useful life, plus high efficiency.

Another object of this invention is to provide a novel control for lamp bank displays whereby the control elements themselves are not subjected to the operating currents required in the lamp bank, but operate instead in a low power circuit, thus reducing the over all costs and heat losses in the mechanism. As a further object, the control provides automatic brightness control for the lamps by monitoring of the controlling elements in the selective circuit which produces the desired figures on the bank.

Another object of this invention is to provide a novel lamp bank control which is applicable to any common type of lamp bank, whether the figures displayed are changeable or constant.

These and further objects will be evident from a study of the attached drawings and the description below. While this disclosure shows two alternate forms of circuitry that might be utilized in the control of a lamp bank, it is to be emphasized that the particular components shown in the diagram and described below are merely exemplary and are not intended to restrict the scope of this invention to a particular application. The extent of this invention is clearly set out in the claims following this description.

In the drawings:

FIGURE 10 is a front view of a second lamp bank which might be utilized with regard to the present controls;

FIGURE 11 is a sectional view cut along line 11—11 in FIGURE 10;

FIGURE 12 is an enlarged view of the upper left hand corner as seen in FIGURE 11; and FIGURE 13 is a schematic wiring diagram of a second embodiment of the invention.

*General description*

Figure 1:
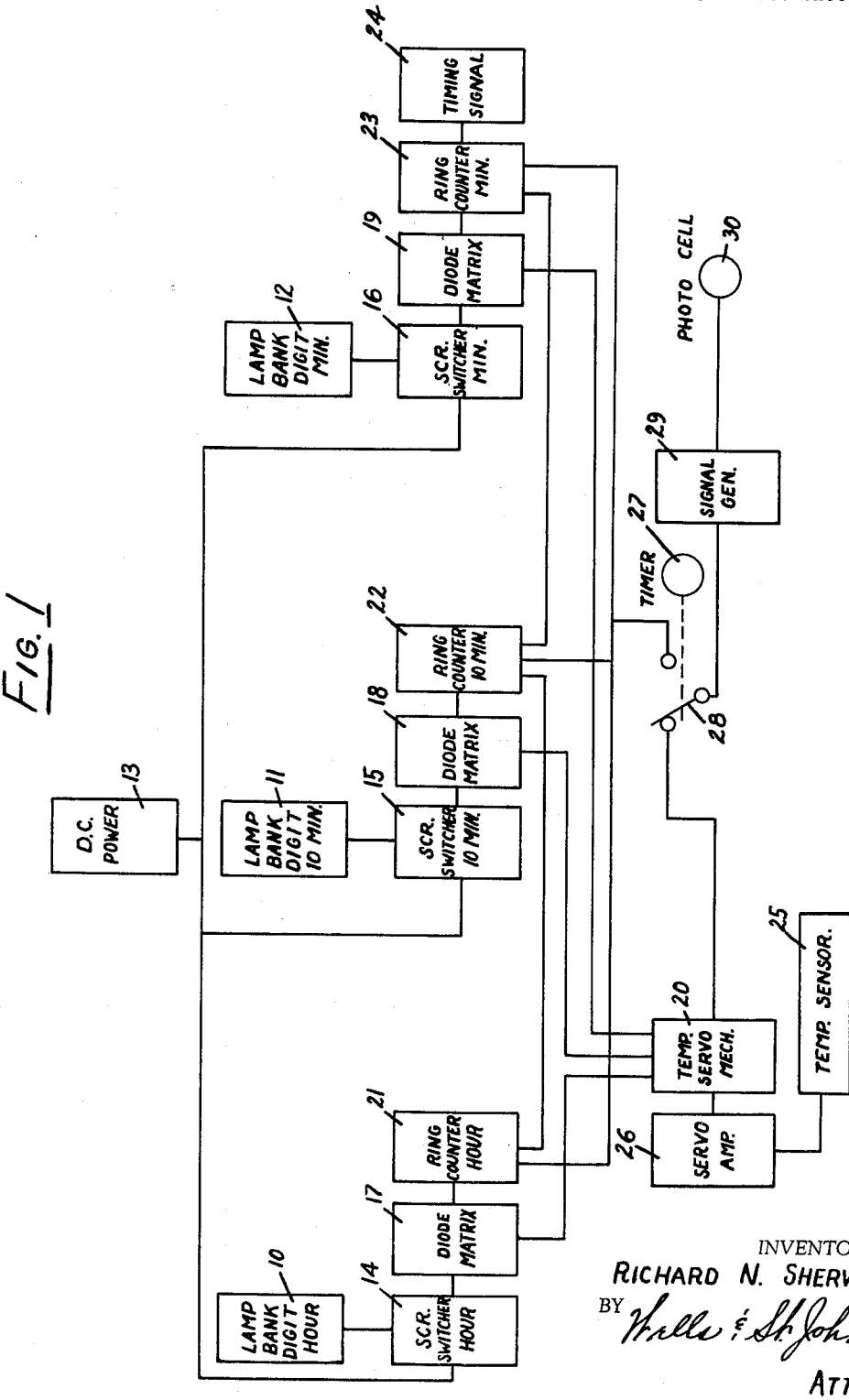
FIGURE 1 is a schematic block diagram of the circuitry utilized according to this invention in a device for displaying time and temperature alternately upon a lamp bank.

Referring now to the drawings, and particularly to the over all schematic view shown in FIGURE 1, this invention is illustrated as it might be applied to a lamp bank display for alternately displaying time and temperature. The lamp bank comprises three basic groups of lamps indicated generally as 10, 11 and 12. These lamp banks are not shown in detail but might utilize the same arrangement as shown in Patent No. 3,041,596, granted to Edward M. Caferro et al., on June 26, 1962, for display signs. Each of the lamp banks 10, 11 and 12 includes several subgroups of lamps which are selected so as to display the desired numeral. The lamp bank 10 is utilized in the display of hours and in the display of the tens in a temperature unit. The lamp bank 11 is used to display the ten-minute digits in the time display and also to show the units in a temperature display. The right-hand bank 12 is used to display the unit minutes in a time display and also to show a degree sign in a temperature display. In addition, the lamp bank 10 includes a group of lamps used to show a minus sign during certain temperature displays and two lamps are normally included between the banks 10 and 11 to show the necessary colon in the time displays. The physical arrangement of the lamps in banks 10, 11 and 12 is unchanged from that disclosed in the prior patent above and will not be further described herein.

The lamp banks are operated from a source of pulsating direct current power 13 which may be a source of unfiltered rectified alternating current. The source of D.C. power 13 is connected to the lamp banks 10, 11 and 12 through a series of SCR switching circuits, generally designated as 14, 15 and 16. The SCR in each of the circuits 14, 15 and 16 controls the individual lamp groups of each of the lamp banks 10, 11 and 12 respectively. Thus, when the individual SCR's are activated, there will be completed a circuit to the lamps of the respective groups so as to activate these lamps and produce a lighted display on the banks 10, 11 and 12.

The SCR switching circuits 14, 15 and 16 are controlled respectively by three diode matrix modules 17, 18 and 19 respectively. Each of these modules has a blocking connection of diodes to produce individual circuits capable of showing the desired digits in the displays to be produced on the lamp banks 10, 11 and 12. Each matrix module 17, 18 and 19 has two or more inputs.

The diode matrix modules 17, 18 and 19 in the example shown are alternately controlled by a temperature servo mechanism 20 and a ring counter circuit comprising an hours counter 21, a ten-minute counter 22 and a minute counter 23. The minute counter 23 is monitored by a timing signal generated in a circuit 24 and the ring counter 23 in turn operates the counter 22 which, in turn, controls the counter 21. The temperature servo mechanism 20 is operated by a temperature sensor 25 through an amplifier 26.

The alternating display is controlled by a continuously operable timer 27 and an alternating switch 28 operated thereby. The phase of the SCR's in circuits 14, 15 and 16 is controlled by a signal generator 29 which is under the control of a photo-conductive cell 30 that monitors existing light conditions at the lamp banks 10, 11 and 12.

In general, then, the lamp banks 10, 11 and 12 are operated by SCR switching circuits 14, 15 and 16 which select the lamps to be lighted by the source of power 13. In the first embodiment illustrated, the SCR circuits 14, 15 and 16 are controlled by diode matrixes 17, 18 and 19, there being an individual input into each diode matrix 17, 18 and 19 for each numeral to be displayed on the banks controlled thereby. These individual inputs of the matrixes 17, 18 and 19 are in turn selected by the ring counters 21, 22 and 23 or by the temperature servo mechanism 20. The alternating displays are selected by a time switch 28 from the signal generator 29 which produces the necessary gate signal for the SCR's in circuits 14, 15 and 16. In addition the phase of the signal from the generator 29 is controlled by photo cell 30 so that the brightness of the lamps selected by the SCR circuits 14, 15 and 16 may be varied to meet existing light conditions.

Power controls

Figure 2:
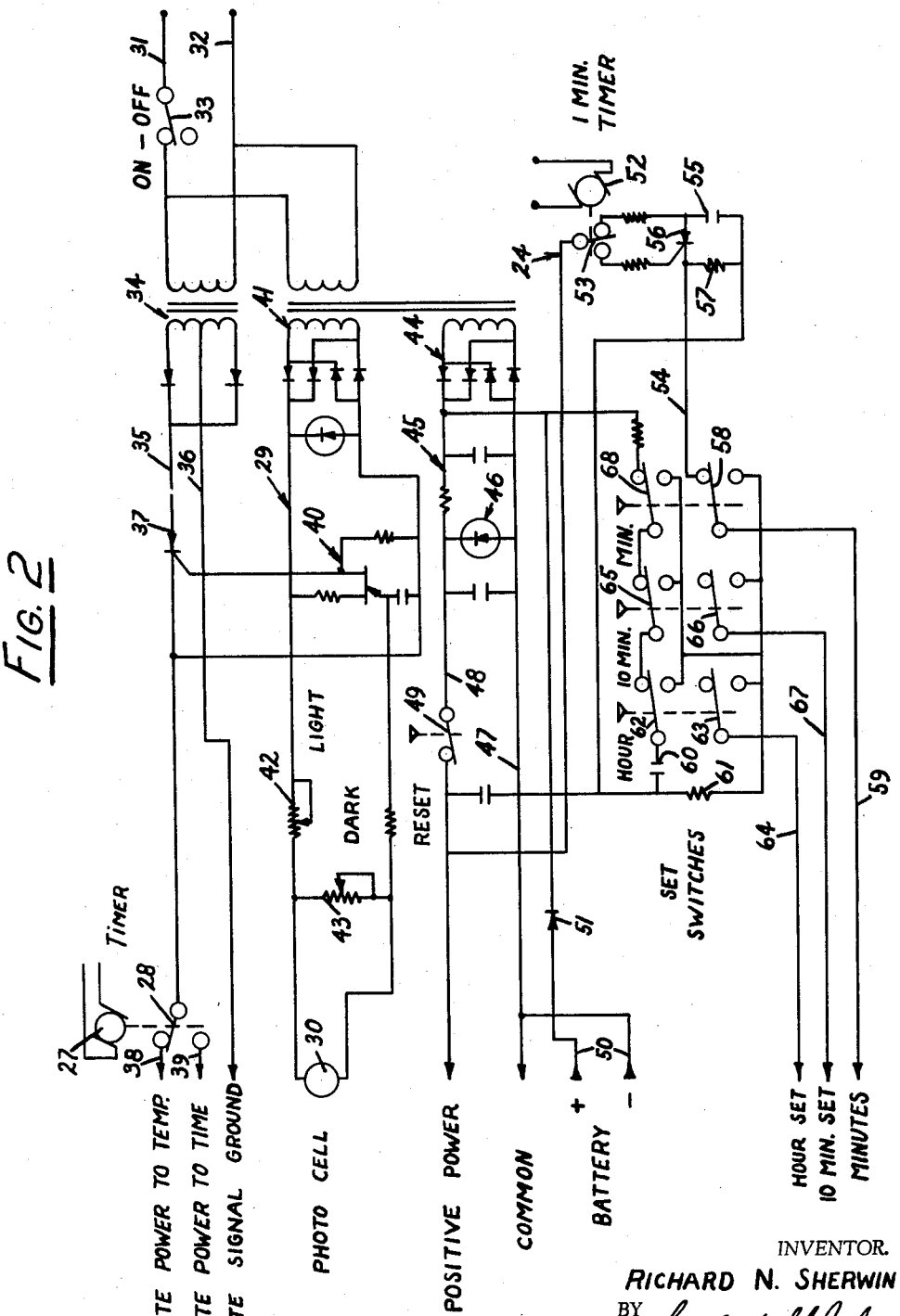
FIGURE 2 is a schematic wiring diagram of the power controls for the circuitry shown in FIGURE 1.

The signal generator 29, switch 28 and the various controls for the electronic clock mechanism are illustrated in greater detail in FIGURE 2. At the top of this figure are shown two inputs 31, 32 connected to a suitable source of alternating current power. Located in series with the input 31 is a master switch 33 which controls the entire mechanism. The inputs 31 and 32 are connected to a rectifying transformer 34 which converts the alternating current power to a low-voltage, pulsating direct current in lines 35 and 36. The line 35 includes an SCR 37 wired in series with the previously described switch 28 which is controlled by the timing motor 27. The line 36 comprises the gate signal ground for the SCR in each of the circuits 14, 15 and 16. The line 35 is selectively connected by switch 28 to lines 38 and 39 which comprise the gate power lines to the temperature controls and time controls respectively. The SCR 37 acts as an amplifier in the main circuit for the lamps, controlling the power to the time and temperature-indicating mechanisms as determined by the photo cell 30.

The gate of the SCR 37 is controlled by an oscillator 40 which is powered by a power supply 41. The oscillator 40 is connected to a photo-conductive cell 30 with limiting variable resistances 42 and 43. The resistance 43 may be manually adjustable to set the lower limit of brightness in the lamps for night use, while the resistance 42 may be manually adjusted to set the upper limit of brightness in the lamps for daytime use. The photo-conductive cell 30 varies the phase angle of the oscillator 40, which in turn triggers the gate of SCR 37, thereby producing a variable pulsating voltage at the alternating switch 28. By reducing the period of the pulse in the current flowing through switch 28, the signal generator 29 therefore controls the brightness of the lamps lighted in the lamp banks 10, 11 and 12.

Clock mechanism

The lower portion of FIGURE 2 shows the power supply for the ring counters 21, 22 and 23. The D.C. power supply 44 is filtered at 45 and is connected to a voltage regulator 46. The output of the voltage regulator 46 is supplied through lines 47 and 48. Line 48 includes a reset switch 49. The line 48 comprises the positive power supply to the ring counters 21, 22 and 23, while the line 47 is the common ground to these ring counters 21, 22 and 23. In order to insure continuous counting operation of the clock mechanism during a temporary power failure, there is provided a standby battery supply 50 which is connected by means of a blocking diode 51 to the output connections of the power supply 44. The blocking diode 51 insures that current during normal operation will not flow from the power supply 44 to the battery supply 50. The timing signal device 24 comprises a one-minute timing motor 52 which operates an alternating switch 53. The switch 53 produces a pulse at a line 54 by alternately charging and discharging a condenser 55 through SCR 56 and resistor 57. The pulse is transmitted through a switch 58 to the line 59 to drive the minute ring counter 23.

In order to allow manual setting of the clock mechanism, there is provided a condenser 60 that is charged by the battery 50 when the reset switch 49 has been opened. The condenser 60 is manually discharged through a resistor 61 by closing of simultaneously-operated switches 62 and 63 to reset the hours ring counter 21. The switch 62 closes the circuit across resistance 61 while the switch 63 connects the resistance 61 to a line 64 which transmits the pulse to the ring counter 21. Each time the switches 62 and 63 are manually closed, a single pulse will be transmitted to the ring counter 21 to thereby set the hours counter 21 alone. A pair of similar switches 65 and 66 are utilized to manually set the 10-minute ring counter 22. A switch 65 serves to discharge condenser 60 through the resistance 61 while switch 66 connects the resistance 61 to line 67 wired to the ring counter 22. Thus, each time the switches 65 and 66 are manually closed, the ring counter 22 will receive one pulse through the line 67. The minutes ring counter 23 is controlled through switches 68 and 58 in the same manner, the switch 68 serving to discharge condenser 60 through the resistance 61 and the switch 58 serving to transmit the pulse through line 59 to the ring counter 23.

Figure 3:
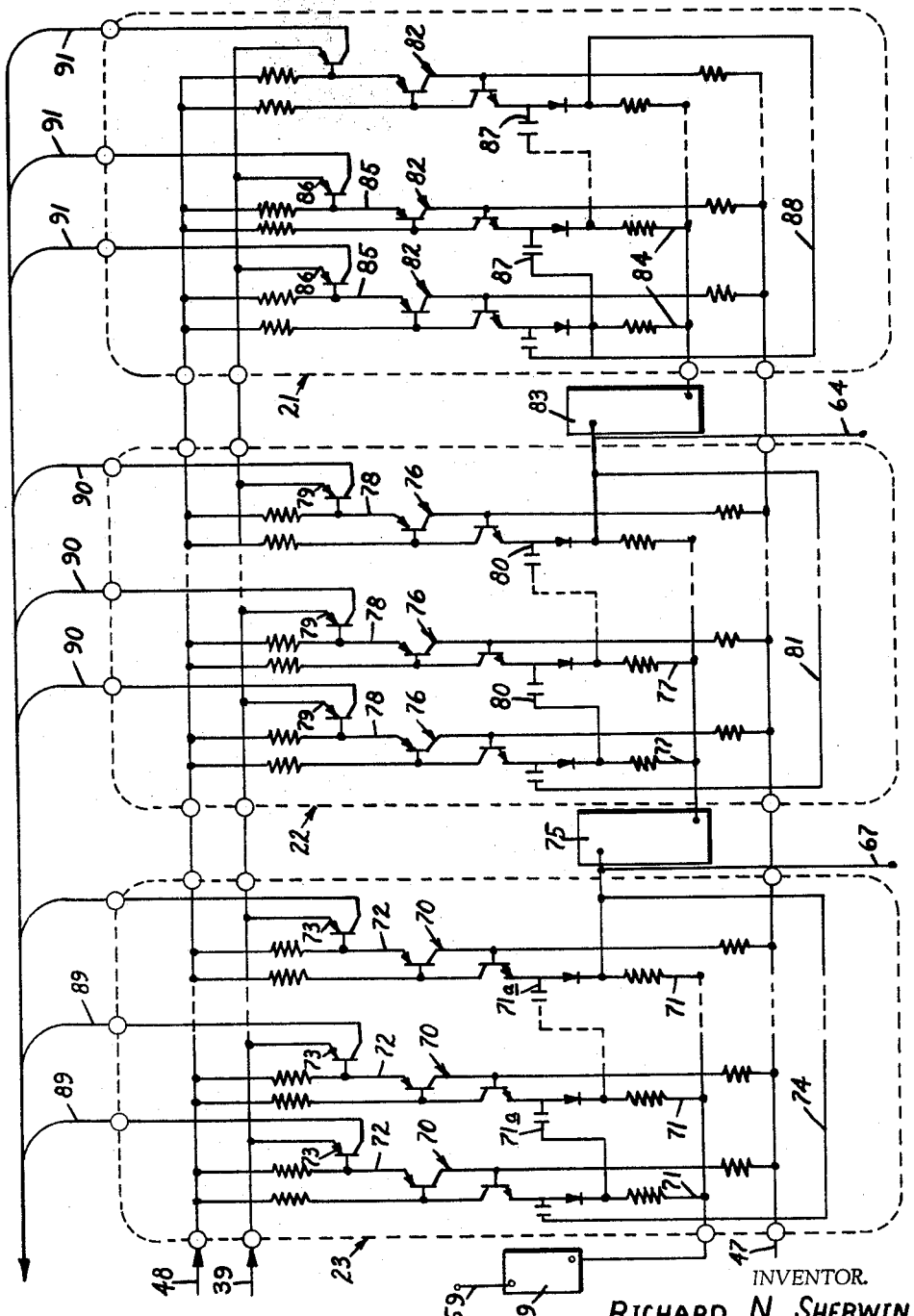
FIGURE 3 is a schematic wiring diagram of the ring counters utilized in the control system shown in FIGURE 1.

The line 59 transmits the normal pulse each minute from line 54 through an amplifier 69 to the three ring counters 21, 22 and 23 shown schematically in FIGURE 3. The amplifier 69 feeds the pulse to a series of flip-flop circuits generally designated by the numerals 70. Each circuit 70 is a transistor circuit having an input connection 71 through which the pulse is delivered and an output at 72 connected to a gate transistor 73. The circuits 70 are connected at 71a in such a fashion that each pulse through the line 59 will cause a successive circuit 70 to conduct at 72. As each circuit 70 is turned off by the succeeding pulse through line 59, the next circuit 70 will be turned on due to the connection at 71a. The final circuit 70 in the ring counter 23 is connected back to the initial circuit 70 by line 74. Although only three circuits 70 are shown in FIGURE 3, in a time mechanism there will be 10 such circuits to control the 10 necessary digits, 0 through 9, used to display minute digits. The final output of the last flip-flop circuit 70 in ring counter 23 is wired through an amplifier 75 to the input of a similar flip-flop circuit 76 in the ten-minute ring counter 22. Each circuit 76 also includes a pulse-receiving input 77 and an output 78 connected to a gate transistor 79. Each circuit 76 is also connected to its succeeding circuit by a connection designated as 80. The final circuit 76 is wired back to the initial circuit 76 by a connecting line 81. In a time system, the ten-minute ring counter 22 will include six circuits 76, which will be activated successively by the pulse transmitted through amplifier 75 from the final circuit 70 of the ring counter 23. The six circuits 76 are utilized to select the six numerals, 0 through 5.

The ring counter 21, used to designate hours, comprises a series of flip-flop transistor circuits labelled generally as 82. Ring counter 21 is connected to the final circuit 76 of ring counter 22 through an amplifier 83. Each circuit 82 has an input 84 which receives the pulse transmitted through amplifier 83 from the final circuit 76 of ring counter 22. Each circuit 82 also has an output at 85 connected to a gate transistor 86. The successive circuits 82 are connected by lines 87, so that a pulse through the amplifier 83 will successively cause the circuits 82 to conduct. The final circuit 82 is also connected to the initial circuit 82 by means of line 88. Again the number of circuits 82 is determined by the number of digits to be displayed. In the case of a normal 12-hour clock mechanism, there will be 12 of the circuits 82 in the ring counter 21. These will successively control the display of numerals 1 through 12. However, if a 24-hour clock is desired, there would naturally be 24 of the circuits 82 in the ring counter 21 so as to successively energize the numerals 1 through 24.

The gate transistors 73, 79 and 86 are wired to the positive power line 48 from the power supply 44 and to the gate power supply 39 from the signal generator 29. The gate signals from the transistors 73, 79 and 86 are transmitted through lines 89, 90 and 91, respectively. Thus, from the minutes ring counter 23 there are ten gate signal outputs 89. The ten-minute ring counter 22 has six gate signal outputs 90, and the ring counter 21 for hours has twelve gate signal outputs 91. As each pulse is received through the line 59, there will be a pulse generated through one of the gate signal outputs 89. There will also be a pulse generated through one of the gate signal outputs 90 and 91. However, the activated gate signal output of the ring counters 22 and 21 will change only every 10 pulses and 60 pulses, respectively. Thus, the signal through the outputs 89 will be an indication of minutes while the signal through the outputs 90 will be an indication of ten-minute intervals, and the signal through the outputs 91 will be an indication of hour intervals.

In addition to the successive activation of the ring counters 21, 22 and 23, there are also included inputs 59, 67 and 64 by which the individual ring counters 23, 22 and 21, respectively, may be manually reset as described above. It will be seen that resetting the minutes ring counter 23 will automatically cause the ten-minutes ring counter 22 and the hours counter 21 to be reset in succession, while the resetting of the ten-minutes ring counter 22 will also control the hours ring counter 21.

Lamp controls

Figure 4:
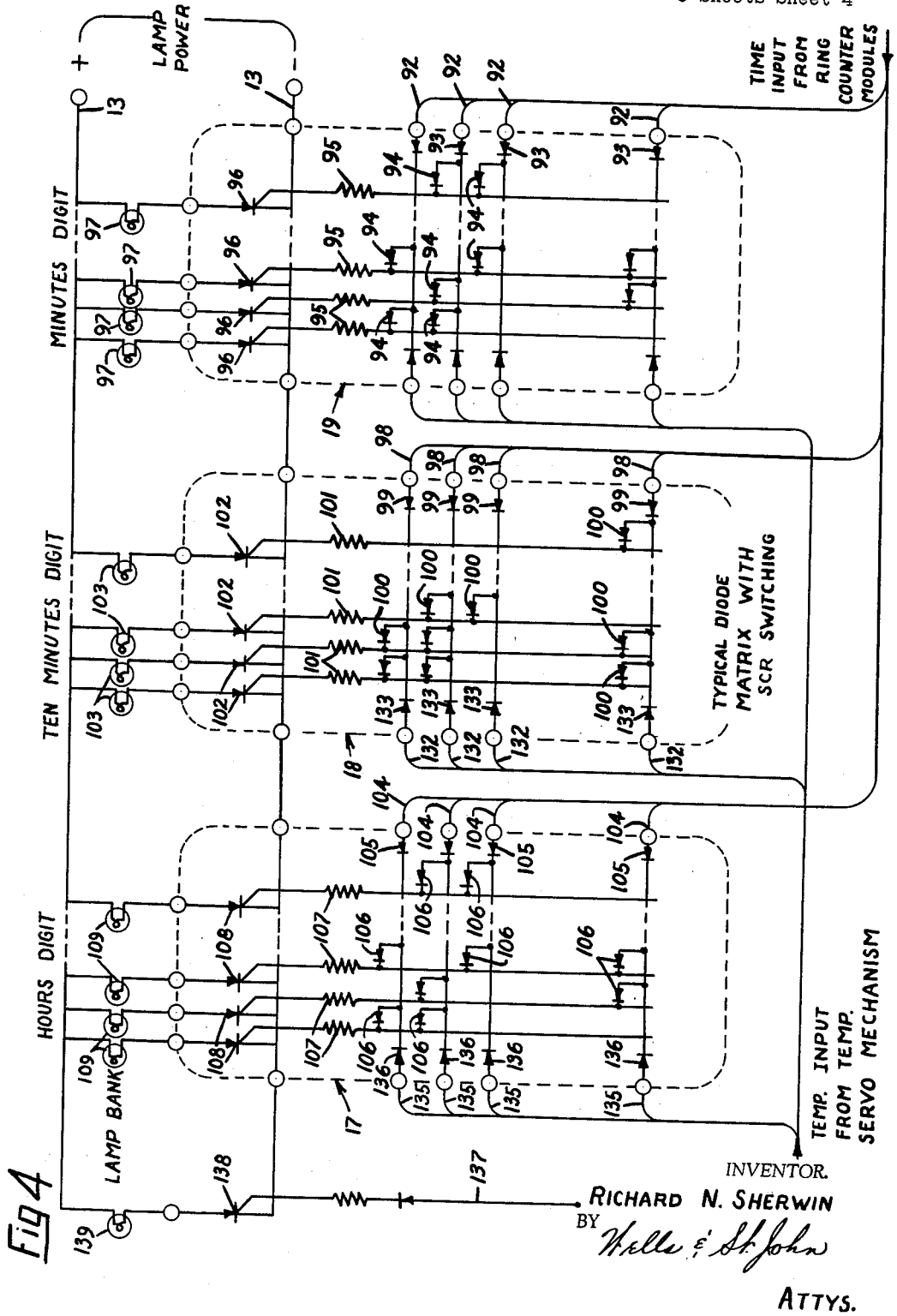
FIGURE 4 is a schematic wiring diagram of the diode matrices and lamp controls shown in FIGURE 1.

The diode matrix modules 17, 18 and 19 are illustrated in FIGURE 4. The minutes diode matrix 19 has a series of inputs 92 which are respectively connected to the individual gate signal outputs 89 shown in FIGURE 3. Each of the inputs 92 is connected by means of a diode 93 and an individual circuit-blocking diode 94 to a limiting resistor 95 wired to the gate of a power SCR 96. Each SCR 96 is conected in series with an individual group of lamps 97 in the minute lamp bank 12. The SCR 96 and lamp group 97 are connected in series across the source of pulsating D.C. power 13. Within the diode matrix 19 each input 92 may be connected to more than one of the limiting resistors 95, to thereby select the groups of lamps 97 required to indicate the desired numeral. The blocking diodes 94 prevent the actuation of lamps 97 through the plurality of input connections required where the individual lamp groups 97 are utilized in more than one numeral display. The diodes 93 also act as blocking diodes to prevent the flow of current to the time ring counter 23 when the lamps 97 are being operated by the temperature controls.

The diode matrix 18 is similar to the matrix 19 and has a plurality of inputs 98 wired respectively to the outputs 90 of the ring counter 22. Each of the inputs 98 is connected through a diode 99 to individual blocking diodes 100 wired to limiting resistance 101 connected to the gate of a power SCR 102. Each SCR 102 is also connected in series across the source of power 13 along with a lamp group 103 in the ten-minute lamp bank 11. The operation of these components is analogous to those described with relation to the diode matrix 19.

The diode matrix 17 is similar to the matrixes 18 and 19. It comprises a plurality of inputs 104 wired respectively to the individual gate signal outputs 91 of the ring counter 21. Each input 104 is wired through a diode 105 and individual blocking diodes 106 to selected limiting resistances 107 connected to the gate of an individual power SCR 108. Each SCR 108 is connected in series with a lamp group 109 across the source of D.C. power 13. Thus it can be seen that the pulses received from the ring counters 21, 22 and 23 operate through the respective SCR switches 108, 102 and 96 to control the groups of lamps 109, 103 and 97 which are activated to produce a desired time display.

Temperature controls

The temperature display in this particular embodiment of the invention is derived from a servo mechanism device 20 shown in detail in FIGURES 6–9. A schematic representation of the temperature servo mechanism 20 is shown in FIGURE 5.

Figure 5:
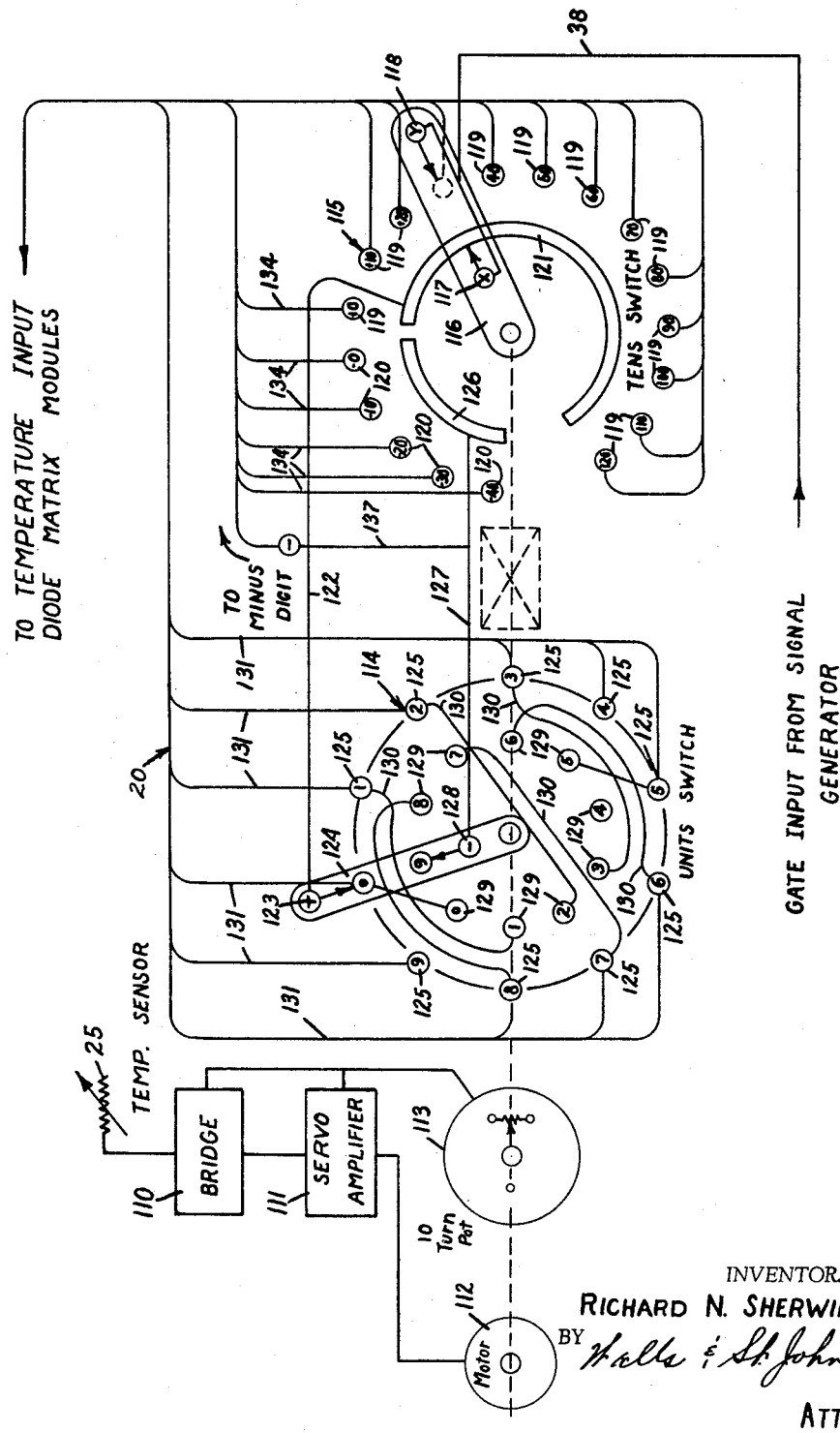
FIGURE 5 is a schematic view of the temperature sensing devices and switching mechanisms shown in FIGURE 1.
Figure 6:
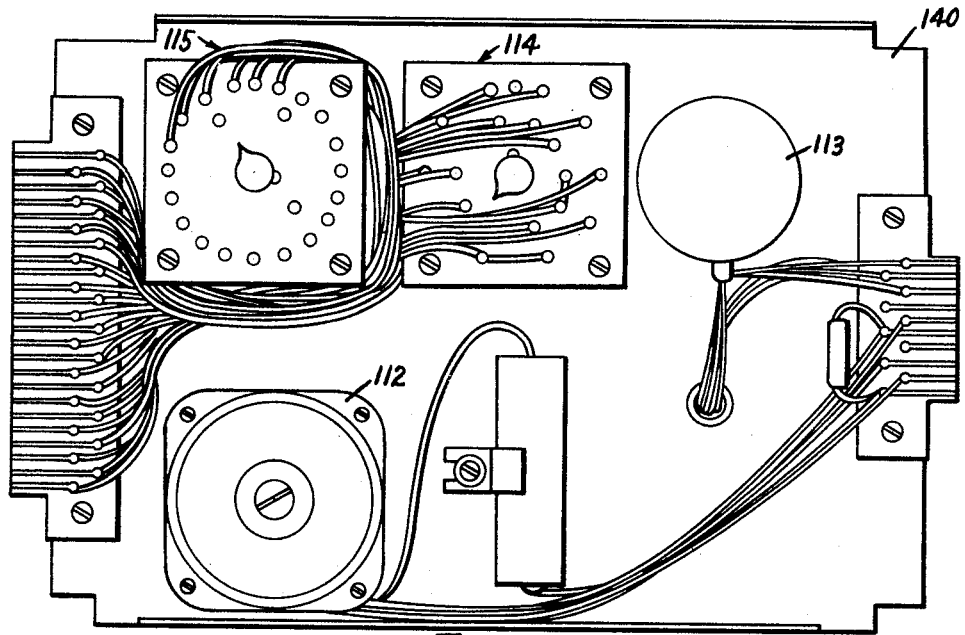
FIGURE 6 is a back view of a temperature sensing mechanism which might be utilized in the controls of FIGURE 1.
Figure 7:
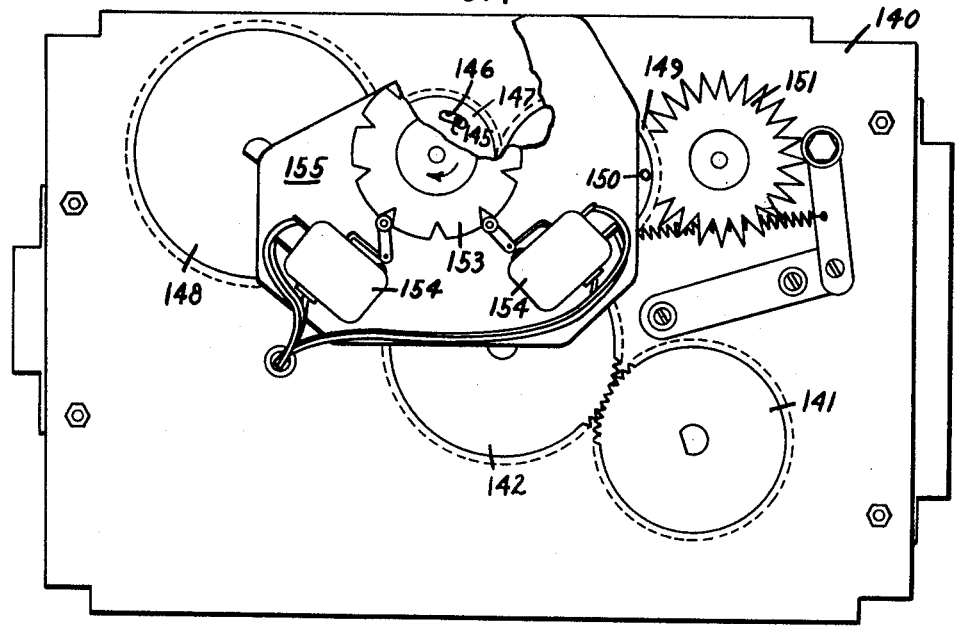
FIGURE 7 is a front view of the device shown in FIGURE 6.
Figure 8:
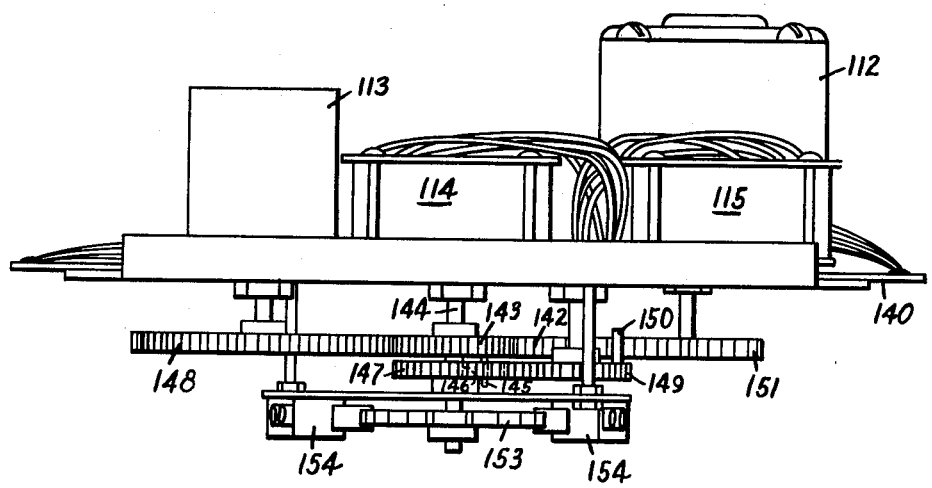
FIGURE 8 is a top view of the device seen in FIGURE 6.
Figure 9:
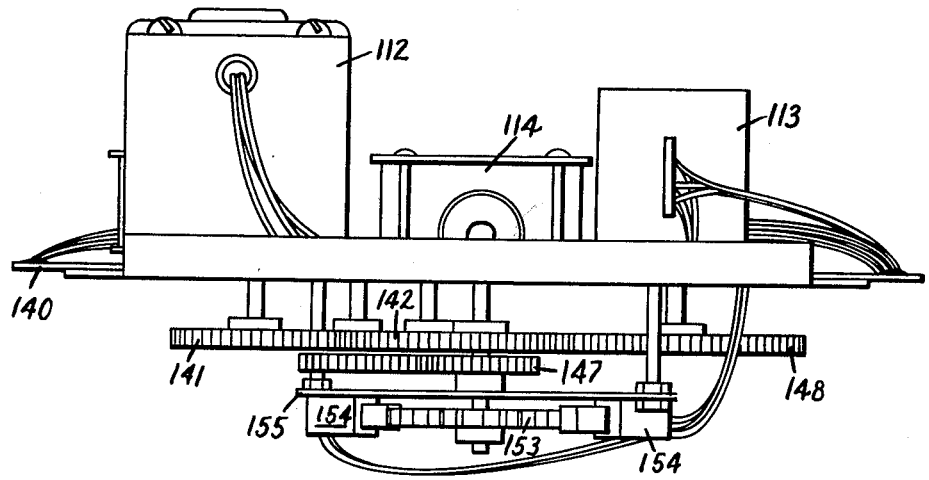
FIGURE 9 is a bottom view of the device shown in FIGURE 6.

As shown by the schematic view in FIGURE 5, the temperature sensor 25 is wired to a D.C. bridge 110, which in turn is connected to servo amplifier 111. The amplifier 111 controls a motor 112. The motor 112 operates a potentiometer 113 and is connected to a unit switch generally designated by the numeral 114. The connection between the motor 112 and the unit switch 114 allows the motor shaft to turn freely between units. There is also a stepped connection from the shaft of motor 112 to a tens switch 115 which turns once for every ten steps turned by the units switch 114.

The gate signal from line 38 is supplied to the rotor 116 of switch 115 at points 117 and 118. Switch 115 is provided with a plurality of contacts 119 used to indicate tens units of temperature above zero and a plurality of terminals 120 used to indicate tens units of temperature below zero. If the switch 115 is in any position representing a temperature above zero, the gate signal from line 38 is passed to the point 117 through a strip 121 and line 122 to a first point 123 on rotor 124 of the units switch 114. This causes the gate signal from line 38 to be passed to the outside contacts 125 of the unit switch 114. At any position of switch 115 representing a temperature below zero, the gate signal is routed by means of points 117, a second strip 126, and line 127, to a second point 128 on the rotor 124. Thus the gate signal will appear on the inside row of contact 129 of switch 114. The jumpers 130 connecting the outer terminals 125 and the corresponding inner terminals 129 then reverse the indication supplied to the diode matrixes 17 and 18 so that the temperature indication will be correct at the lamp banks 10 and 11.

The terminals 125 and 129 are connected by outputs 131 to the temperature inputs 132 of the diode matrix 18 as shown in FIGURE 4. The inputs 132 are connected by diodes 133 to the individual blocking diodes 100 to thereby select the particular SCR's 102 necessary to activate the lamps 103 for the unit display in the temperature indication. The terminals 119 and 120 are wired by indiivdual outputs 134 to the temperature inputs 135 of the diode matrix 17. Inputs 135 are connected by diodes 136 to the individual blocking diodes 106 to thereby select the SCR's 108 necessary to activate the lamp groups 109 to thereby produce on the board the required lighted lamps to indicate the ten and hundred units of temperature. In addition, there is a direct contact from the strip 126 by means of line 137 which is wired directly to an SCR 138 controlling a special group of lamps 139 that shows a minus indication on the lamp bank 10 when the temperature is below zero.

The temperature servo mechanism 20 is more specifically seen in FIGURES 6–9. The unit is shown mounted on a plate 140. The motor 112 drives a first gear 141 mounted on the front of plate 140 and meshing with a transfer gear 142. The transfer gear 142 in turn meshes with a first small gear 143 rotatably journalled on a shaft 144 supported by the plate 140. Gear 143 has an axially-protruding pin 145 received within an arcuate slot 146 in a similar gear 147 fixed to the shaft 144. The shaft 144 is connected directly to the rotor 124 of the switch 114 so that rotation of gear 147 will cause like rotation of the rotor 124. The length of slot 146 is such that the gear 143 may turn an angular amount corresponding to the spacing of terminals 125 and 129 in the switch 114. Thus hunting of the motor 112 due to fractional temperature variations will not be transmitted to the rotor 124.

The gear 143 meshes directly with a large gear 148 connected to the shaft of potentiometer 113, so that all motion transmitted from the motor 112 will be directly to potentiometer 113 to provide the necessary balancing of the bridge 110. The gear 147 meshes with a second gear 149 mounted on plate 140. Gear 149 has a pin 150 adapted to engage a slotted wheel 151 once for each revolution of the gear 149. The wheel 151 is held in position by a yieldable stop 152. The wheel 151 is directly connected to the mounting shaft for the rotor 116 of switch 115. Thus, each time the switch 114 has been turned a full 10 units, the switch 115 will be turned one unit to thereby step up the indication of the tens portion of the temperature digits.

There is also provided a holding circuit for motor 112 to insure full movement of the rotor 124 between terminals 125 and 129. Mounted on the shaft 144 is an indexing wheel 153 slotted so as to correspond to the angular spacing of the terminals 125 and 129. The slots in the wheel 153 are adapted to be engaged by the hinged levers of small switches 154 mounted on a fixed plate 155. The individual switches 154 are connected to the power source for motor 112 so that one switch 154 will maintain the motor 112 in a first direction of motion when closed, and the other switch 154 will maintain motor 112 in its second direction of rotation when it is closed. Only one of the switches 154 will close when the wheel 153 is turned in a given direction and that switch alone will cause the motor 112 to continue turning until the switch is opened by engagement of the next slot in the wheel 153. Thus, each time the wheel 153 begins to turn, the respective switches 154 will insure the turning of shaft 144 to engage the successive terminals 125 and 129.

It is also possible that the temperature responsive device could be electronically operated by means of ring counters or similar circuits. In like manner the clock device of this mechanism can be controlled by a mechanical servomechanism such as that described with relation to the temperature device. In either instance the two devices will control the SCR power circuits and the diode matrixes as described above. It also is to be understood that this application is not restricted to time and temperature indications but that the controlling devices may indicate any desired indicia, such as changeable highway speed, dates, scores, etc.

*Operation*

The operation of the controls described above should be evident from the descriptions previously given. Basically the large power loads are concentrated at the lamp banks 10, 11 and 12 through the switching circuits 14, 15 and 16. The brightness controlling signal generator 29 and the counting circuits are operable on low circuits, so as to better utilize available semi-conductor elements.

All switching for the lamp banks 10, 11 and 12 is carried out electronically at the SCR's 108, 102 and 96, which select the lamp groups 109, 103, 97 required for a desired display. Brightness of the lamps is automatically controlled by the signal generator 29 and photo-cell 30, which monitor existing light conditions. By shifting the phase angle of the pulse at SCR 37, the signal generator controls the period of conduction at SCR's 108, 102 and 96. The pulsating current at power supply 13 will cause the controlled lamps to be intermittently energized, and the length of the energized period will determine the lamp brightness. This feature is due to the characteristic of an SCR which allows it to continue to conduct current, after receiving a pulse, so long as current is applied across it. The pulsating current at power supply 13 then produces the necessary current gaps to permit control of lamp brightness.

The diode matrix arrangement allows one to utilize the same electronic switching devices and brightness controls for display of a plurality of different quantities selected by independent controls. Although only two selecting devices are shown above, any plural member may be utilized.

The electronic clock device is an improvement over mechanical devices in that it permits independent setting of minutes, ten minutes or hours, by use of reset switch 49 and switches 62, 63, 65, 66, 68 and 58. It is not necessary to run the unit through a display of several hours to initially set it or for correction purposes.

The temperature servo-mechanism 20 is a simple device insuring proper temperature displays for rising or falling temperatures. It automatically counts plus or minus degrees from zero, using a minimum of mechanical elements.

The controlling circuits as described above, will alternately display time and temperature on the lamp banks 10, 11 and 12. No mechanical switching devices are utilized, thereby reducing maintenance. The use of modular semi-conductor circuits allows one to place the individual components on separate cards, which may be replaced or removed without disturbing the remaining portions of the controls. The entire control unit may be very compact, and may be either mounted physically with the lamp banks 10, 11 and 12, or at a remote position.

*Modified controls*

In FIGURE 13 is shown a modified circuit designed to replace the modular units shown in FIGURE 4. Although only a single lamp bank 10 is shown schematically in FIGURE 13, it is obvious that such an arrangement may be utilized in connection with each of the lamp banks. The lamp groups 160 are controlled directly by diodes 161 wired in a matrix leading to an individual SCR 162 for each digit to be displayed on the lamp groups 160. The gate power for the individual SCR 162 is supplied through blocking diodes 163 from a plurality of pulse sources generally designated as 164 and 165. The sources 164 and 165 may be inputs from the time and temperature mechanisms described above. The individual SCR 162, the diodes 161 and the necessary lamp groups 160 are wired in series with a power supply generally shown as 166.

This type of a circuit has the advantage of requiring fewer numbers of SCR's, however, it does necessitate the loading of the diodes 161 by the lamp supply 166. It is primarily advisable only where the lamps 160 are operated at a low wattage. In addition the rectifiers 162 might well be replaced by mechanical relays in conditions where maintenance is of no great significance.

*Alternate lamp bank display*

Shown in FIGURES 10 through 12 is a lamp bank such as might be used on a highway as a changeable speed control indicator. The manner in which the indicated speed is arrived at is immaterial to the present disclosure and may be either automatic or manual in character. Basically the lamp bank is mounted on a stationary frame 170 and has a hinged front panel 171 rotatably mounted by a hinge 172. The panel 171 may be a plastic panel and is preferably a sunscreen over the lamp cylinders 173.

The individual lamps of the bank are mounted in sockets 174 secured to the cylinders 173 at the back ends thereof. The lamp sockets 174 are wired to a diode matrix 175 which might be of the type shown in FIGURE 13, or of the type shown in FIGURE 4. The diode matrix 175, which might also include suitable switches, relays, or SCR's, is wired to a controlling device adapted to select speeds to be indicated on the lighted lamps.

Quite obviously the controlling circuitry described above, might be utilized to display any required digits, letters, or other information. The mechanisms remove the necessity of mechanical parts and insure a long life of effective, changeable signs. Where necessary memory circuits may be included, so that in highway installations the speed indicated by the lamps would be repeated until changed. The display may even be continuous if so desired, being changed only periodically at weekly or monthly intervals.

Various modifications will propose themselves to a person skilled in the art and for this reason the above examples are not intended to limit or restrict the invention except as it is defined in the claims which follow.

Having thus described my invention, I claim:

1. A control apparatus for lamp bank displays comprising:
    a source of power;
    a lamp bank including a plurality of lamps wired in lamp groups adapted to be selectively activated to produce a desired lighted display;
    gate controlled rectifier means, said lamp groups and said gate controlled rectifier means being wired in series across said source of power, said gate controlled rectifier means including gate connections for reception of an activated signal;
    gate signal generator means;
    selector means operatively connected to the gate connections of said gate controlled rectifier means and to said gate signal generator means for completing selected connections between said gate signal generator means and said gate controlled rectifier means to thereby establish desired connections across said power source through said lamp groups and gate controlled rectifier means;
    and a diode matrix comprising a plurality of parallel blocking diodes wired individually in series between said selector means and said lamp groups for preventing the completion of undesired circuits through lamp groups utilized in more than one of the desired lighted displays.

2. A control apparatus for lamp bank displays, comprising:
    a source of pulsating direct current power;
    a lamp bank including a plurality of individual lamps wired in lamp groups adapted to be selectively activated to produce a desired lighted display;
    individual gate controlled rectifier means for completing and holding a circuit after reception of a gate signal, said lamp groups and said gate controlled rectifier means being wired in series across said source of pulsating direct current power, each of said individual gate controlled rectifier means having a gate connection for reception of an activating signal;
    light controlled gate signal generator means;
    selector means operatively connected to the gate connections of said gate controlled rectifier means and to said gate signal generator means for completing selected connections between said gate signal generator means and said gate controlled rectifier means to thereby establish desired connections across said power source through said lamp groups and gate controlled rectifier means;
    and a diode matrix comprising a plurality of parallel blocking diodes wired individually in series between said selector means and said lamp groups for preventing the completion of undesired circuits through lamp groups utilized in more than one of the desired lighted displays.

3. A control apparatus as defined in claim 2 wherein said light controlled gate signal general means comprises:
    an oscillator circuit operatively connected to said selector means;
    and light responsive photocell means connected to said oscillator circuit for varying the phase angle of the oscillator signal responsive to the intensity of incident light received thereby.

4. A control apparatus as defined in claim 2 wherein said light controlled gate signal generator means comprises:
    a second source of pulsating direct current;
    second gate controlled rectifier means wired in series between said second source of pulsating direct current power and said selector means, said second gate controlled rectifier means having a gate connection for reception of an activating signal;
    an oscillator circuit wired to the gate connection of said second gate controlled rectifier means;
    and light responsive photocell means connected to said oscillator circuit for varying the phase angle of the oscillator signal responsive to the intensity of incident light received thereby.

5. A control apparatus as defined in claim 2 wherein said selector means comprises:
    an electronic counter circuit for the counting of time in terms of minutes, tens of minutes and hours, said counter circuit including reset means for selectively advancing the counter circuit independently in each unit of time.

6. A control apparatus as defined in claim 2 wherein said selector means comprises:
    a plurality of electrical circuits individually indicative of selected temperatures;
    and temperature responsive servo-mechanism means operatively connected to said electrical circuits for selectively completing said electrical circuits.

7. A control apparatus as defined in claim 2 wherein said selector means comprises:
    a temperature responsive circuit;
    a time responsive circuit;
    and means for selectively connecting said gate signal generator means to said temperature responsive circuit and said time responsive circuit in an alternating sequence.

References Cited by the Examiner

UNITED STATES PATENTS

| | | | |
|---|---|---|---|
| 1,832,707 | 11/31 | Hull | 315—157 |
| 2,123,459 | 7/38 | Andersen | 315—158 |
| 2,410,156 | 10/46 | Flory | 58—23 |
| 2,519,993 | 8/50 | Allen | 340—336 |
| 2,573,076 | 10/51 | Welch | 340—339 |
| 2,612,551 | 9/52 | Kreiner | 340—176 |
| 2,918,608 | 12/59 | Reith | 340—336 |
| 2,920,240 | 1/60 | Macklem | 315—294 |
| 2,922,981 | 1/60 | Anderson | 340—336 |
| 2,953,776 | 9/60 | Blutman | 340—336 X |
| 2,958,179 | 11/60 | Wolfe et al. | 58—24 |
| 2,987,715 | 6/61 | Jones et al. | 340—324.1 |
| 3,015,094 | 12/61 | Reynolds | 340—338 |
| 3,032,686 | 5/62 | Mathis | 340—336 |
| 3,041,596 | 6/62 | Caferro et al. | 340—309.1 |

FOREIGN PATENTS

| | | |
|---|---|---|
| 237,893 | 9/60 | Australia. |
| 828,783 | 2/60 | Great Britain. |
| 1,210,415 | 3/60 | France. |

NEIL C. READ, *Primary Examiner.*